United States Patent [19]

Sato

[11] 3,862,368

[45] Jan. 21, 1975

[54] AUTOMATIC TELEPHONE ANSWERING APPARATUS

[75] Inventor: Takashi Sato, Saitama, Japan

[73] Assignee: Pioneer Electronic Corporation, Tokyo, Japan

[22] Filed: Jan. 26, 1973

[21] Appl. No.: 326,722

[30] Foreign Application Priority Data

Jan. 26, 1972 Japan .................................. 47-9718

[52] U.S. Cl. .......................... 179/6 R, 179/100.1 VC

[51] Int. Cl. ............................................ H04m 1/64

[58] Field of Search .................... 179/6 R, 100.1 VC

[56] References Cited

UNITED STATES PATENTS

| | | | |
|---|---|---|---|
| 3,133,992 | 5/1964 | Dickman | 179/100.1 VC |
| 3,713,039 | 1/1973 | Hashimoto | 179/6 R |
| 3,715,506 | 2/1973 | Hagg et al. | 179/100.1 VC |
| 3,728,487 | 4/1973 | Hata | 179/6 R |
| 3,728,487 | 4/1973 | Hata | 179/6 R |
| 3,786,191 | 1/1974 | Nagasawa | 179/6 R |

*Primary Examiner*—Stanley M. Urynowicz, Jr.
*Attorney, Agent, or Firm*—Sughrue, Rothwell, Mion, Zinn & Macpeak

[57] ABSTRACT

An automatic telephone answering apparatus in which the recording operation for incoming messages is started just after the closing of a talking circuit. The recording operation is performed in parallel with the sending operation of previously recorded outgoing messages and is continued during the predetermined period after the sending operation is finished. The output circuit is switched off at each blanking time of the outgoing messages thereby the incoming messages, if any, can be clearly recorded.

3 Claims, 4 Drawing Figures

AUTOMATIC TELEPHONE ANSWERING APPARATUS

BACKGROUND OF THE INVENTION

1. Field of the Invention

This invention relates to an automatic telephone answering apparatus and, more particularly, relates to such an apparatus which is able to record any words uttered by a caller.

2. Description of the Prior Art

At the beginning of a telephone talking, a caller generally utters some words before he knows that the other party is an automatic telephone answering apparatus. Sometimes these words are an important part of the caller's message. In order to record these words, an automatic telephone answering apparatus is provided wherein an answering means operates in response to bell signals, sends out an outgoing message to a caller, and beings to record both the outgoing message and an incoming message simultaneously with the beginning of the outgoing message.

However, the signal level of the incoming message is usually about 20 dB lower than that of the outgoing message; consequently, the incoming message is destroyed by noise in the answering means even if the outgoing message has pauses in the speech.

It is possible to solve these problems by providing a voice switching circuit wherein a switch is connected between the answering means and the telephone line. The switch is OFF when there is no outgoing message and is ON when there is an outgoing message. The switch is turned to ON when the recorded portion of the tape comes to the reproducing head. Therefore the extreme portions of the message cannot be sent out clearly, i.e., the switch is turned ON by making use of the reproduced message itself.

On the other hand, when the switch is turned ON if the level of the message signal is very low, the switch is continuously kept ON by the noise signal; and the switch does not switch when the tape for outgoing message is changed because of the difference of the recorded level.

SUMMARY OF THE INVENTION

It is an object of the present invention to provide an automatic telephone answering apparatus which is able to send out the whole outgoing messages clearly, particularly the extreme portions of the message.

It is another object of the present invention to provide an automatic telephone answering apparatus wherein an output circuit for the outgoing message is turned OFF while there is no message to be sent out so that the incoming message received during this period can be recorded with good quality.

DESCRIPTION OF THE PREFERRED EMBOODIMENT

Figure 3:
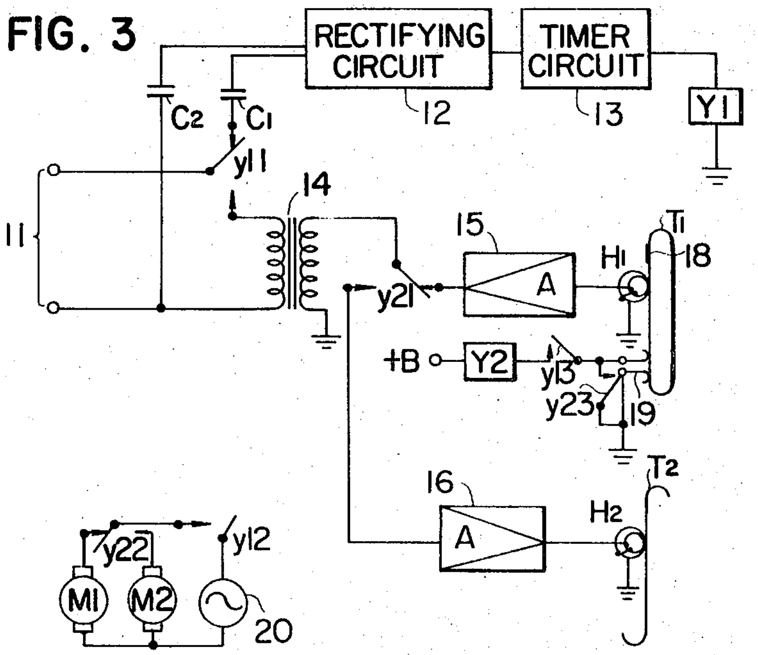
FIG. 3 is a circuit diagram of a typical atuomatic answering device which may be used with the present invention.

Referring first to FIG. 3, there is shown a typical prior art telephone answering apparatus. Terminals 11 are connected to a telephone line and are coupled by way of capacitors $C_1$ and $C_2$ to a rectifying circuit 12. An incoming message signal is detected by the rectifier circuit 12 to activate the timer circuit 13. The timer circuit 13 operates relay $Y_1$ for a predetermined time which is typically a time duration equal to the prerecorded message, say 10 seconds, plus an additional period of time to allow for the recording of a message from a caller, say 30 seconds. When relay $Y_1$ is energized, relay contacts $y_{11}$, $y_{12}$ and $y_{13}$ are closed. Motor $M_1$ is thereby connected to an energizing voltage 20 to cause message tape $T_1$ to be transported past reproducing head $H_1$. Head $H_1$ is connected to the input of amplifier 15 which has its output connected by way of matching transformer 14 and the closed relay contacts $y_{11}$ to the telephone line terminals 11. In this manner, a prerecorded message on tape $T_1$ is reproduced over the telephone line.

Tape $T_1$ is an endless tape and carries a metalized strip 18 which marks the end of the prerecorded message. When the metalized strip 18 bridges the contacts 19, relay $Y_2$ is energized through contact $y_{13}$ and contacts 19. When relay $Y_2$ is energized, the contacts $y_{21}$, $y_{22}$ and $y_{23}$ are switched. As a result, motor $M_2$ is energized causing tape $T_2$ to be transported. The telephone line terminals 11 are now connected by way of contact $y_{11}$, matching transformer 14 and contact $y_{21}$ to the input of amplifier 16. The output of amplifier 16 is connected to recording head $H_2$ which records an incoming message on tape $T_2$. Relay $Y_2$ is latched in the energized position by contact $y_{23}$ which maintains the connection of one end of the relay coil to ground.

At the end of the predetermined time for sending out the prerecorded message on tape $T_1$ and recording an incoming message on tape $T_2$, the timer circuit 13 de-energizes relay $Y_1$. This causes the relay contacts $y_{11}$, and $y_{12}$ and $y_{13}$ to assume the positions shown in FIG. 3 of the drawings. Since relay contact $y_{13}$ is open, relay $Y_2$ is also de-energized causing relay contacts $y_{21}$, $y_{22}$ and $y_{23}$ to assume the positions shown in FIG. 3 of the drawings. Neither of the motors $M_1$ and $M_2$ is energized and the apparatus is ready to receive the next incoming call.

Figure 1:
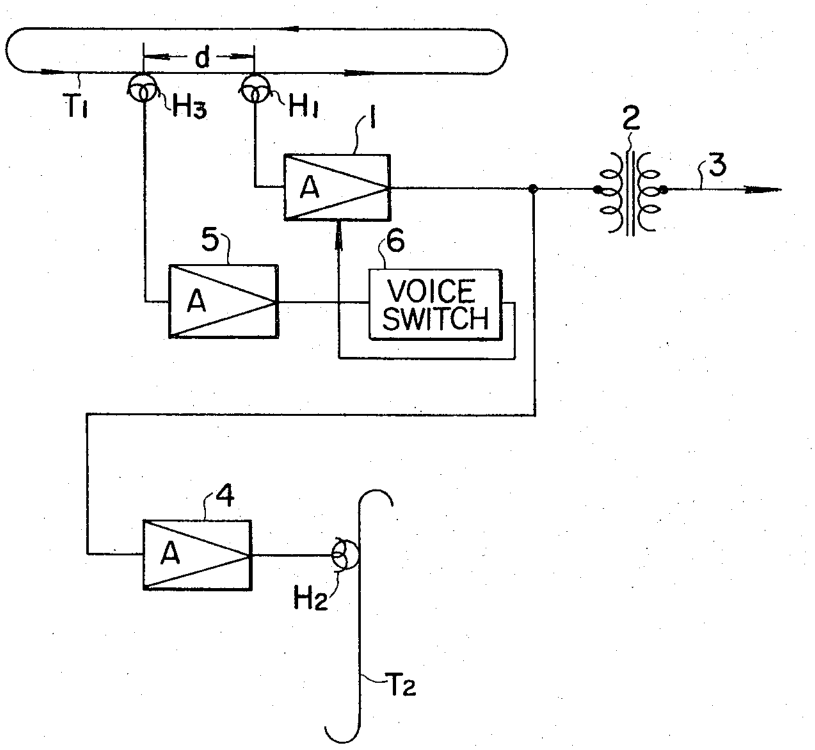
FIG. 1 is a circuit diagram of an embodiment of the present invention.

In the circuit shown in FIG. 1, the symbol $T_1$ is a tape for an outgoing message which has been previously recorded. The Tape $T_1$ is usually an endless type and is started by a tape transport mechanism which is energized by a calling signal; further, the tape $T_1$ is stopped when its top end comes to a predetermined point. The automatic answering device shown in FIG. 3 is modified according to the invention so that both tape transport motors $M_1$ and $M_2$ are energized simultaneously and relay $Y_2$ and its associated contacts are eliminated. This will become more apparent from the following description.

The outgoing message which has been recorded on the tape $T_1$ is reproduced by the first magnetic head $H_1$, amplified by an amplifier 1, and then sent out into the telephone line 3 through the matching transformer 2. The input terminal of the amplifier 4 is connected with the output terminal of the amplifier 1. The amplifier 4 amplifies signals sent out over the telephone line 3 and signals coming from the calling party over the telephone line 3. The signals are amplified and fed into the magnetic head $H_2$ and recorded on the magnetic tape $T_2$.

The magnetic tape $T_1$, the magnetic head $H_1$ and the amplifier 1 comprise an answering means which sends out the outgoing message over the telephone line 3. The amplifier 4, the magnetic head $H_2$ and the magnetic tape $T_2$ comprise a recording means which records both the signal coming from the answering means and the signal coming from the telephone line 3. The recording means begins its recording operation simultaneously with the beginning of the answering operation of the answering means, and finishes after a predetermined period.

Figure 4:
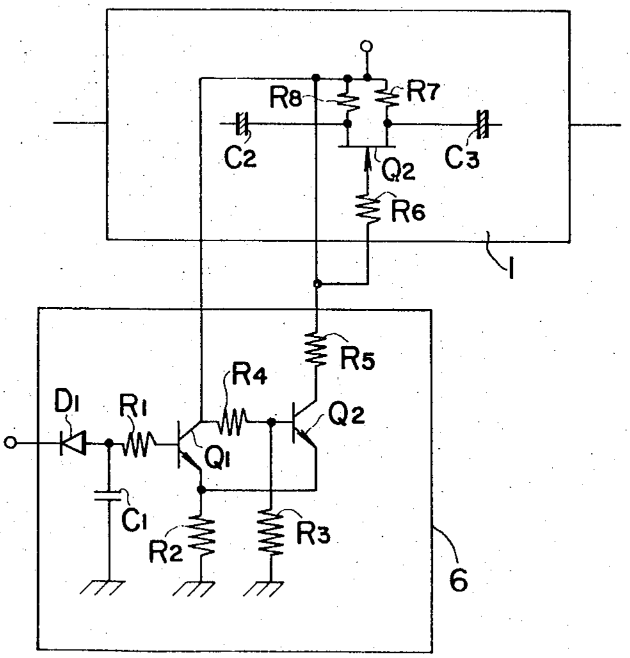
FIG. 4 is a schematic diagram of the voice switch controlled amplifier used in the circuit of FIG. 1 according to a preferred embodiment of the invention.

There is another magnetic head $H_3$ a distance d from the magnetic head $H_1$ and in front of the head $H_1$ with respect to the direction of movement of the magnetic tape $T_1$. This magnetic head reproduces the outgoing message recorded on the magnetic tape $T_1$ before the magnetic head $H_1$ does. The output signal of the magnetic head $H_3$ is amplified by an amplifier 5 and then fed into an input terminal of a voice switching circuit 6. When the output level of the magnetic head $H_3$ becomes higher than a predetermined value, the voice switching circuit 6 turns ON (or OFF) and when the output level of the magnetic head $H_3$ becomes lower than the predetermined value, the voice switching circuit 6 turns OFF (or ON). When the voice switching circuit 6 is in the former state, the output signal of the amplifier 1 is produced at its output terminal, and when the voice switching circuit 6 is in the latter state, the amplifier 1 is controlled so as not to produce an output signal. A typical voice switch which can be used in the present invention is shown in FIG. 4.

When the outgoing message is set out to a caller, both magnetic head $H_1$ and $H_3$ are simultaneously operated to reproduce the outgoing message of the magnetic tape $T_1$. But the message is reproduced by the magnetic head $H_3$ first, and then reproduced by the other magnetic head $H_1$ after a certain period required for the magnetic tape to travel the length *d*.

The outgoing message signal being reproduced by the magnetic head $H_3$ is amplified by the amplifier 5 to thereby actuate the voice switching circuit 6. Voice switching circuit 6 controls amplifier 1 so that the output signal of the magnetic head $H_1$ is amplified and the signal is sent out over telephone line 3 through the matching transformer 2. When no voice signal is recorded on magnetic tape $T_1$, namely the blanking period of the outgoing message, the output level of the head $H_3$ becomes lower to thereby actuate the voice switching circuit 6. The output of the amplifier 1 is cut off by the circuit 6 after a certain period (this period is nearly equal to the time required of the magnetic tape $T_1$ to move the length *d*).

Figure 2:
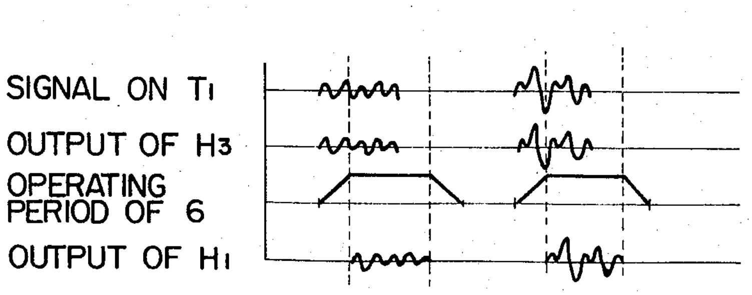
FIG. 2 is a timing chart wherein an operating period of each part of the embodiment is shown.

The relations among the recorded portion of the magnetic tape $T_1$, the output signal of the magnetic head $H_3$, the operation of the voice switching circuit 6, and the output signal of the amplifier 1 are shown as the timing chart of FIG. 2. When the output level of the magnetic head $H_3$ reaches the predetermined value, the voice switching circuit 6 is actuated, but the amplifier 1 does not become operable until the magnetic head $H_1$ reproduces the same recorded portion. Therefore the outgoing message can be clearly sent out over the telephone line 3 with the beginning of the message. On the contrary, during the blanking period of the outgoing message, no signal is reproduced by magnetic head $H_3$, and no output signal of the amplifier 1 is sent over the telephone line 3. Therefore, when the outgoing message is blank, the noise of the reproducing circuit is not applied to the telephone line 3 and the amplifier 4. Thus the incoming message coming from a caller through the telephone line 3 can be recorded on the magnetic tape $T_2$ with good quality (high S/N ratio.)

The voice switching circuit 6 is not operated by the output of the magnetic head $H_1$ but, rather, the output of head $H_3$. Consequently, the operating level can be set high enough, without any cracking of the outgoing messae, and the voice switching circuit 6 can be operated accurately.

The voice switching circuit 6 and amplifier 1, according to a preferred embodiment of the invention, are shown in detail in the schematic diagram of FIG. 4. The output of amplifier 5, shown in FIG. 1, is applied to diode $D_1$ which rectifies the prerecorded message signal causing capacitor $C_1$ to be charged. Capacitor $C_1$ is connected by resistor $R_1$ to the base of transistor $Q_1$ which is normally nonconducting. Transistor $Q_1$ has its collector connected to a source of voltage on the one hand and by way of resistor $R_4$ to the base of transistor $Q_2$ on the other hand. The emitters of transistors $Q_1$ and $Q_2$ are connected in common through resistor $R_2$ to ground. The base of $Q_2$ is connected through resistor $R_3$ to ground, while the collector of transistor $Q_2$ is connected by way of resistors $R_5$ and $R_6$ to the gate of field-effect transistor $Q_2$ and amplifier 1. The source and drain electrodes of the field-effect transistor $Q_2$ and amplifier 1 are connected to the common source of voltage by means of resistors $R_7$ and $R_8$. Coupling capacitors $C_2$ and $C_3$ are connected to the reproducing head $H_1$ on the one hand and to the input of amplifier 4 on the other hand.

When the reproduced prerecorded message signal exceeds a predetermined level, that is, when the charge on capacitor $C_1$ produces a voltage at the base of transistor $Q_1$ equal to that transistor's turn-on voltage, transistor $Q_1$ conducts turning off normally conducting transistor $Q_2$. When transistor $Q_2$ ceases to conduct, the bias voltage on the gate electrode of field-effect transistor $Q_2$ increases causing it to become conductive. In effect, the field-effect transistor $Q_2$ operates as a switch which is closed or open depending on the nonconduction or conduction, respectively, of transistor $Q_2$. During the blanking period on the prerecorded message tape $T_1$, charge is no longer accumulated on capacitor $C_1$ and, instead, the charge on capacitor $C_1$ is discharged through resistor $R_1$, the base emitter of transistor $Q_1$, and resistor $R_2$. The RC time constant represented by this discharge path maintains transistor $Q_1$ in a conducting state for a predetermined time or until the voltage at the base of transistor $Q_1$ is no longer sufficient to cause transistor $Q_1$ to conduct. By proper choice of capacitor $C_1$ and resistors $R_1$ and $R_2$, the RC time constant can be made equal to the time represented by the transport delay caused by the separation distanced between reproducing heads $H_1$ and $H_3$ on tape $T_1$, as shown in FIG. 1.

While the invention has been particularly shown and described with reference to the preferred embodiment thereof, it will be understood by those skilled in the art that various changes in form and details may be made therein without departing from the spirit and scope of the invention.

I claim:

1. An automatic telephone answering apparatus comprising:

a. a first magnetic tape for an outgoing message;

b. a first magnetic head for reproducing the outgoing message;

c. a first amplifier means to amplify and send out the output signal of the first magnetic head over a telephone line;

d. a second magnetic head positioned to reproduce the outgoing message recorded on the first magnetic tape prior to the first magnetic head;

e. voice switching means responsive to the output of said second magnetic head for controlling said first amplifier means such that said first amplifier means is ON only when a voice signal on said first magnetic tape is reproduced by said first magnetic head;

f. a second magnetic tape coupled to the output of said first amplifier means for recording an incoming message; and g. a third magnetic head to record the incoming message on the second magnetic tape.

2. The apparatus of claim 1 wherein the second magnetic head is positioned at a predetermined distance in front of the first magnetic head in the direction of movement of the first magnetic tape.

3. The apparatus of claim 2 wherein said voice switch means delays the control of said first amplifier means by a predetermined amount of time equal to the time required for a point on the first magnetic tape to move the predetermined distance.

* * * * *